US007630784B2

(12) United States Patent
Hunt et al.

(10) Patent No.: US 7,630,784 B2
(45) Date of Patent: Dec. 8, 2009

(54) METHOD AND APPARATUS FOR INDEPENDENT DEPLOYMENT OF ROLES

(75) Inventors: Rashmi Hunt, Palo Alto, CA (US); Zeenat Kulkarni, Foster City, CA (US); Jose Angel Martinez Rodriguez, Menlo Park, CA (US); Edwin V. Sapugay, San Mateo, CA (US); Harshal Hemendra Shah, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 11/187,294

(22) Filed: Jul. 22, 2005

(65) Prior Publication Data

US 2007/0022127 A1 Jan. 25, 2007

(51) Int. Cl.
*G06F 7/00* (2006.01)

(52) U.S. Cl. ........................................ 700/100; 707/10

(58) Field of Classification Search .................. 707/100
See application file for complete search history.

(56) References Cited

U.S. PATENT DOCUMENTS 7,216,088 B1 * 5/2007 Chappel et al. ............... 705/11
2002/0087602 A1 7/2002 Masuda et al. .............. 707/515
2002/0178183 A1 11/2002 Meding ...................... 707/509
2002/0184521 A1 * 12/2002 Lucovsky et al. ........... 713/200
2003/0018963 A1 * 1/2003 Ashworth et al. ........... 717/175
2004/0031058 A1 * 2/2004 Reisman ..................... 725/112
2005/0071805 A1 * 3/2005 Lauterbach et al. ......... 717/104
2006/0195460 A1 * 8/2006 Nori et al. ................... 707/100

FOREIGN PATENT DOCUMENTS

JP 2001297018 A2 10/2001
WO WO 01/08033 A2 2/2001

* cited by examiner

*Primary Examiner*—Pierre M Vital
*Assistant Examiner*—Truong V Vo
(74) *Attorney, Agent, or Firm*—Yee & Associates, P.C.; Prentiss W. Johnson

(57) ABSTRACT

A computer implemented method, an apparatus and computer instruction are provided for deployment of roles. Aspects of the present invention allow user to define in a schema a definition of a relationship that comprises a set of roles participating in the relationship. Each role in the set of roles is defined as an inlined role or an independent role. After the schema is processed, aspects of the present invention determine if the role in the set of roles is an inlined role or an independent role based on the definition of the relationship, deploy the relationship and the role as a single entity if the role is an inlined role, and deploy the relationship and the role as separate entities if the role is an independent role.

6 Claims, 5 Drawing Sheets

```
<xs:complexType name="Relationship"> 402
    <xs:sequence>                         404
        <xs:element name="displayName" type="string" minOccurs="0"/>
406     <xs:element name="property" type="rel:Property" minOccurs="0" maxOccurs=
"unbounded"/>
408     <xs:element name="role" type="rel:RoleBase" minOccurs="0" maxOccurs=
"unbounded">
            <xs:key name="roleBasePropertyKey">   410
                <xs:selector xpath="rel:property"/>
                <xs:field xpath="rel:name"/>
            </xs:key>
            <xs:key name="roleBaseKeyAttributeKey">
                <xs:selector xpath="rel:keyAttribute"/>
                <xs:field xpath="rel:path"/>
            </xs:key>
        </xs:element>
    </xs:sequence>
    </xs:attribute name="identity" type="boolean" use="optional" default="true"/>
    </xs:attribute name="static" type="boolean" use="optional" default="false"/>
    </xs:attribute name="targetNamespace" type="anyURI" use="required"/>
    </xs:attribute name="name" type=NCName" use="required"/>
</xs:complexType>
```

The RoleBase is the inline role in the relationship.

```
<xs:complexType name="RoleBase"> 410
    <xs:sequence>
414     <xs:element name="displayName" type="string" minOccurs="0"/>
416     <xs:element name="property" type="rel:Property" minOccurs="0" maxOccurs=
"unbounded"/>
        <xs:element name="roleObject"> 418
            <xs:complexType>              420
                <xs:sequence>
                    <xs:element name="roleObjectType" type="QName"/>
                    <xs:element name="displayName" type="string" minOccurs="0"/>
                </xs:sequence>
            </xs:complexType>
        </xs:element>
        <xs:element name="keyAttribute" type="rel:KeyAttribute" minOccurs="0"
maxOccurs="unbounded"/>
    </xs:sequence>
    <xs:attribute name="managed" type="boolean" use="optional" default="false"/>
    <xs:attribute name="name" type="NCName" use="required"/>
</xs:complexType>
```

THE INDEPENDENT ROLE IS DEFINED AS FOLLOWS:

```
<xs:complexType name="Role"> 502
    <xs:complexContent>                                504
        <xs:extension base="rel:RoleBase">
            <xs:sequence>                              506
                <xs:element name="relationship" type="QName"/>
            </xs:sequence>
            <xs:attribute name="targetNamespace" type="anyURI" use="required"/>
        </xs:extension>
    </xs:complexContent>
</xs:complexType>
```

```
<?xml version="1.0" encoding="UTF-8"?>
<role xmlns="http://www.ibm.com/xmlns/prod/websphere/wbiserver/rel/6.0.0"
xmlns:bo="http://tempuri.org/ClaContact" xmlns:bo_1="http://tempuri.org/SapContact"
xmlns:bo_2="http://tempuri.org/GenContact"
xmlns:rel="http://www.ibm.com/xmlns/prod/wbi/relationship/ContactIdentityRelationship/6.0.0"
xmlns:rol="http://www.ibm.com/xmlns/prod/wbi/relationship/ContactIdentityRelationship/6.0.0"
xmlns:xs="http://www.w3.org/2001/XMLSchema" managed="false"
name="ClarCont" 702
targetNamespace="http://www.ibm.com/xmlns/prod/wbi/relationship/
 ContactIdentityRelationship/6.0.0">
<relationship>rel:Contact</relationship> 704
    <roleObject>
        <roleObjectType>bo:ClaContact</roleObjectType> 706
        <displayName>ClaContact</displayName>
    </roleObject>
    <keyAttribute>
        <path>ClarifyID</path>
        <displayName>ClarifyID</displayName>
    </keyAttribute>
</role>
```

```
<?xml version="1.0" encoding="UTF-8"?>
<relationship xmlns="http://www.ibm.com/xmlns/prod/websphere/wbiserver/rel/6.0.0"
xmlns:bo="http://www.tempuri.org/GenContact" xmlns:rel="http://null" name="Contact"
targetNamespace="http://null" identity="true" static="false">
</relationship>                                                          722
```

```
<?xml version="1.0" encoding="UTF-8"?>
<relationship xmlns="http://www.ibm.com/xmlns/prod/websphere/wbiserver/rel/6.0.0"
xmlns:bo="http://tempuri.org/ClaContact" xmlns:bo_1="http://tempuri.org/SapContact"
xmlns:bo_2="http://tempuri.org/GenContact"
xmlns:rel="http://www.ibm.com/xmlns/prod/wbi/relationship/ContactNonIdentityRelationship/
6.0.0"
xmlns:rol="http://www.ibm.com/xmlns/prod/wbi/relationship/ContactNonIdentityRelationship/
6.0.0"
xmlns:xs="http://www.w3.org/2001/XMLSchema" identity="false"
static="false"
name="Contact"  602
targetNamespace="http://www.ibm.com/xmlns/prod/wbi/relationship/
ContactNonIdentityRelationship/6.0.0">
    <role managed="true" name="GenCont"  604
        <roleObject>
            <roleObjectType>bo_2:GenContact</roleObjectType>  606
            <displayName>GenContact</displayName>
        </roleObject>
        <keyAttribute>
            <path>ContactID</path>
            <displayName>ContactID</displayName>
        </keyAttribute>
    </role>
    <role managed="true" name="SAPCont">  608
        <roleObject>
            <roleObjectType>bo_1:SAPContact</roleObjectType>  610
            <displayName>SAPContact</displayName>
        </roleObject>
        <keyAttribute>
            <path>SAPID</path>
            <displayName>SAPID</displayName>
        </keyAttribute>
    </role>
</relationship>
```

METHOD AND APPARATUS FOR INDEPENDENT DEPLOYMENT OF ROLES

BACKGROUND OF THE INVENTION

1. Field of the Invention

The present invention relates generally to a data processing system. In particular, the present invention relates to deployment of roles and relationships in a data processing system. Still more particularly, the present invention relates to independent deployment of roles that is local to a relationship in a data processing system.

2. Description of the Related Art

When modeling relationships using enterprise modeling tools, a relationship may correlate two or more semantically equivalent business objects. For example, an order relationship may correlate orders from one system and orders from another system. However, the order relationship is limited to correlate orders only. The order relationship may not correlate other types of business objects, for example, a customer.

A role describes how entities can participate in a relationship. Thus, role definitions are used to capture structure and constraint requirements on particular entities and their manner of participation. For example, for an order relationship, a role of SAP order may be defined for orders from SAP systems and a role of Clarify order may be defined for orders from Clarify systems. SAP is a product available from SAP AG. Clarify is a product available from Hewlett-Packard Development Company, L.P. Each role has its own set of properties or attributes that are specified for its semantics.

In a business integration environment, relationships and roles are deployed in applications. An example of a business integration environment is WebSphere® Business Integration Server, a product available from International Business Machines Corporation. Usually, a role is defined as part of the definition of a relationship. This means that a role is embedded within the definition of a relationship. If a new role needs to be added to the system, all applications in the integration environment with the relationship would be affected.

SUMMARY OF THE INVENTION

Aspects of the present invention provide a computer implemented method, an apparatus, and computer instructions for deployment of roles. Aspects of the present invention provide a definition of a relationship comprising a set of roles participating in the relationship in a schema, wherein a role in the set of roles is defined as an inlined role or an independent role. In addition, aspects of the present invention determine if the role in the set of roles is an inlined role or an independent role based on the definition of the relationship. If the role is an inlined role, aspects of the present invention deploy the relationship and the role as a single entity. If the role is an independent role, aspects of the present invention deploy the relationship and the role as separate entities.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a diagram illustrating an exemplary schema for inlining roles in a relationship in accordance with an illustrative embodiment of the present invention;

FIG. 5 is a diagram illustrating an exemplary schema for a role independent of a relationship in accordance with an illustrative embodiment of the present invention;

FIG. 6 is a diagram illustrating an example implementation of a relationship with inlined roles in accordance with an illustrative embodiment of the present invention;

FIG. 7A is a diagram illustrating an example implementation of a role independent of a relationship in accordance with an illustrative embodiment of the present invention;

FIG. 7B is a diagram illustrating an example implementation of a standalone relationship in accordance with an illustrative embodiment of the present invention.

DETAILED DESCRIPTION OF THE PREFERRED EMBODIMENT

Figure 1:
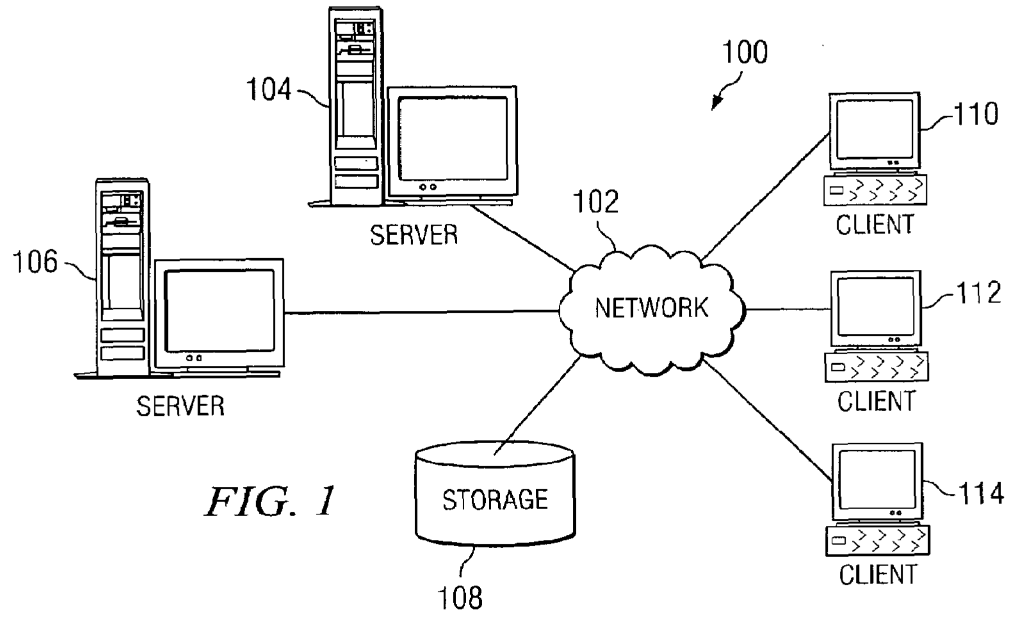
FIG. 1 depicts a pictorial representation of a network of data processing systems in accordance with an illustrative embodiment of the present invention.
Figure 2:
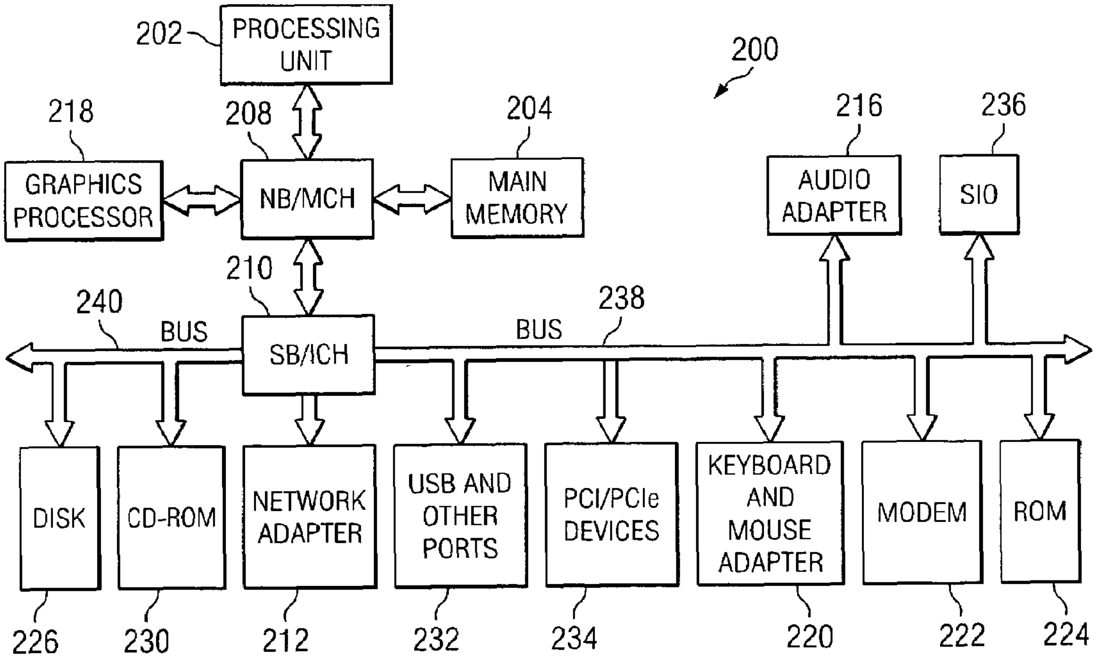
FIG. 2 is a block diagram of a data processing system in accordance with an illustrative embodiment of the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110, 112, or 114 in FIG. 1, in which computer usable code or instructions implementing the processes for embodiments of the present invention may be located.

In the depicted example, data processing system 200 employs a hub architecture including north bridge and memory controller hub (MCH) 208 and south bridge and input/output (I/O) controller hub (ICH) 210. Processing unit 202, main memory 204, and graphics processor 218 are connected to north bridge and memory controller hub 208. Graphics processor 218 may be connected to north bridge and memory controller hub 208 through an accelerated graphics port (AGP).

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 210 through bus 238. PCI/PCIe devices may include, for example, Ethernet adapters, add-in cards and PC cards for notebook computers. PCI uses a card bus controller, while PCIe does not. ROM 224 may be, for example, a flash binary input/output system (BIOS). Hard disk drive 226 and CD-ROM drive 230 connect to south bridge and I/O controller hub 210 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 210.

An operating system runs on processing unit 202 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pseries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 202. Alternatively, a single processor system may be employed.

Instructions for the operating system, the object-oriented programming system, and applications or programs are located on storage devices, such as hard disk drive 226, and may be loaded into main memory 204 for execution by processing unit 202. The processes for embodiments of the present invention are performed by processing unit 202 using computer usable program code, which may be located in a memory such as, for example, main memory 204, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

As some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 204, read only memory 224, or a cache such as found in north bridge and memory controller hub 208 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the present invention provide a method, an apparatus, and computer usable program code for independent deployment of roles that is local to a relationship. One aspect of the present invention enables users to define a relationship and roles that participate in that relationship as separate entities, even though the entities are part of the same relationship. These entities are deployed separately so that new roles may be added to the relationships dynamically. Another aspect of the present invention enables users to define the relationship and new roles as a single entity and deploy it as a single entity. An example of an entity includes a single output file, such as a single extensible markup language (XML) output file.

Figure 3:
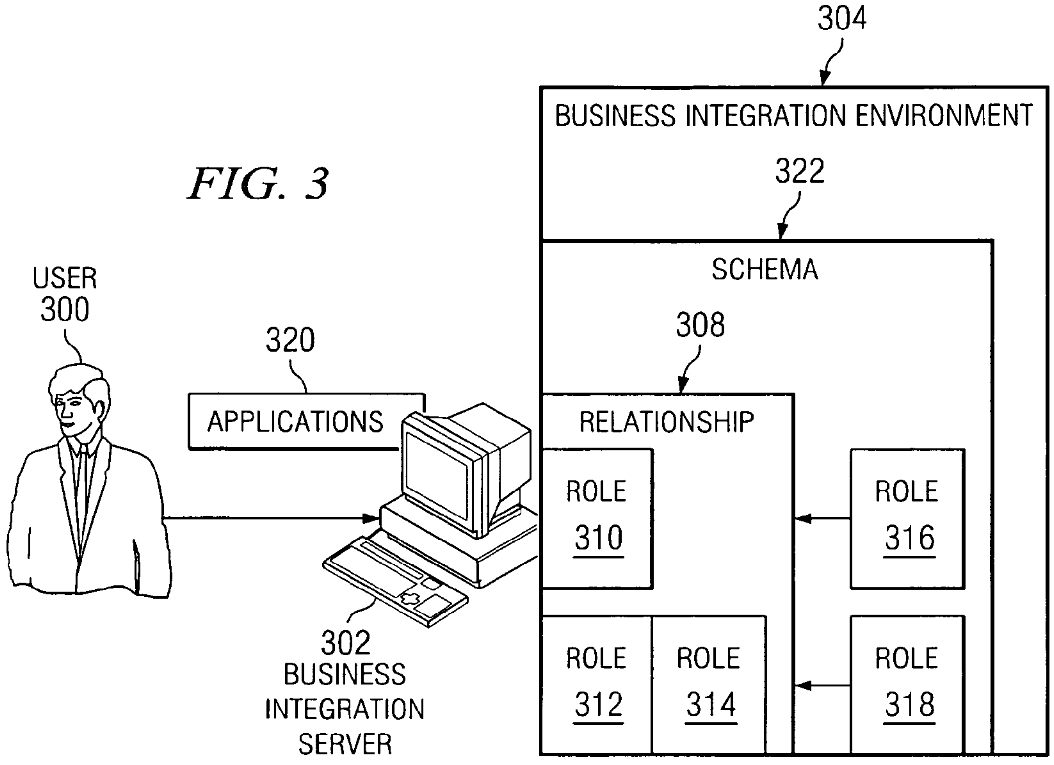
FIG. 3 is a diagram illustrating interactions between components for independent deployment of roles in accordance with an illustrative embodiment of the present invention.

Turning now to FIG. 3, a diagram illustrating interactions between components for independent deployment of roles is depicted in accordance with an illustrative embodiment of the present invention. As shown in FIG. 3, user 300 defines roles and relationships to be deployed to applications 320 using a schema, such as schema 322. Schema 322 is defined within business integration environment 304, which is a business integration environment running on business integration server 302. Currently, roles are defined as part of a relationship. For example, in schema 322, roles 310, 312, and 314 are defined in relationship 308. Relationship 308 and roles 310, 312, and 314 are then deployed to applications 320, which may also be executed on business integration server 302. However, if user 300 defines a new role in relationship 308, applications 320 would halt and changes would be needed in order to accommodate the new role.

With the different features of the present invention, user 300 may define roles that are deployed independent of the relationship in the business model. For example, user 300 may define roles 316 and 318 as independent roles in schema 322. Independent roles are roles that are independent of the definition of relationship 308. In this way, applications 320 would not halt and no changes are needed to accommodate the new role.

Turning now to FIG. 4, a diagram illustrating an exemplary schema for inlining roles in a relationship is depicted in accordance with an illustrative embodiment of the present invention. As shown in FIG. 4, users define relationships and roles using schema 400.

In schema 400, relationship 402 includes display name 404 indicating the name of relationship 402 and property 406 indicating properties of relationship 402. In addition, relationship 402 includes zero or more role elements 408. Role elements 408 define roles that participate in a relationship. Role element 408 is a type of RoleBase element 410, which is a definition of a role inlined in a relationship. The definition of an inlined role is within the definition of the relationship. In this example, RoleBase element 410 is inlined in relationship 402 and hence can be deployed as part of relationship 402.

Similar to relationship 402, RoleBase element 410 includes display name 414 and property 416. In addition, RoleBase element 410 includes a set of roleObject 418, which represents a particular role. Within roleObject 418, a roleObjectType 420 is defined to indicate a business object that corresponds to the particular role. Thus, with the definitions in schema 400, the user may define a relationship with inlined roles to be deployed as a single entity.

Next in FIG. 5, a diagram illustrating an exemplary schema for a role independent of a relationship is depicted in accordance with an illustrative embodiment of the present invention. As shown in FIG. 5, schema 500 is a continuation of schema 400 in FIG. 4 with a definition of an independent Role element 502. Contrary to the inlined role, the definition of an independent role, such as independent Role element 502, is outside of the definition of the relationship. Thus, instead of being part of the definition of relationship 402, role element 502 is an extension of RoleBase 504 with a sequence of relationship 506. Relationship 506 points to the relationship of which Role element 502 is a part. This allows the role to be deployed not as a single entity along with the relationship but independent of the relationship.

After the definitions in schemas 400 and 500 are processed, an extensible markup language file with roles and relationships that adhere to the definitions in schema 400 and 500 is generated. Turning now to FIG. 6, a diagram illustrating an example implementation of a relationship with inlined roles is depicted in accordance with an illustrative embodiment of the present invention. As shown in FIG. 6, schema 600 is an exemplary extensible markup language file that is generated after schema 400 in FIG. 4 is processed. Schema 600 includes a definition of a relationship, Contact 602. Contact 602 includes two inlined role elements, role element GenCont 604 representing general contacts and role element SAPCont 608 representing SAP contacts. Within GenCont 604, a roleObjectType of bo__2:GenContact 606 is defined to indicate a business object that corresponds to role element GenContact 604. Within SAPCont 608, a roleObjectType of bo__1:SAPContact 610 is defined to indicate a business object that corresponds to role element SAPContact 608. Schema 600 illustrates how roles may be inlined in a relationship and deployed as a single markup language file.

Turning now to FIG. 7A, a diagram illustrating an example implementation of a role independent of a relationship is depicted in accordance with an illustrative embodiment of the present invention. As shown in FIG. 7A, markup language file 700 is an exemplary extensible markup language file that is generated after schemas 400 and 500 in FIGS. 4 and 5 are processed. Schema 700 includes a definition of an independent role element known as ClarCont 702. ClarCont 702 is part of a relationship named rel:Contact 704, which represents a relationship named Contact. Within rel:Contact 704, a roleObjectType of bo:ClaContact 706 is defined to indicate a business object that corresponds to role element ClarCont 702.

Turning to FIG. 7B, a diagram illustrating an example implementation of a standalone relationship is depicted in accordance with an illustrative embodiment of the present invention. As shown in FIG. 7B, markup language file 720 is an exemplary extensible markup language file that is generated after schemas 400 and 500 in FIGS. 4 and 5 are processed. Schema 720 includes only a definition of a relationship named Contact 722. Contact 722 is referred to as rel: Contact 704 in FIG. 7A. Markup language files 700 and 720 illustrate how a role and the relationship in which the role is a part of may be deployed as separate markup language files.

Figure 8:
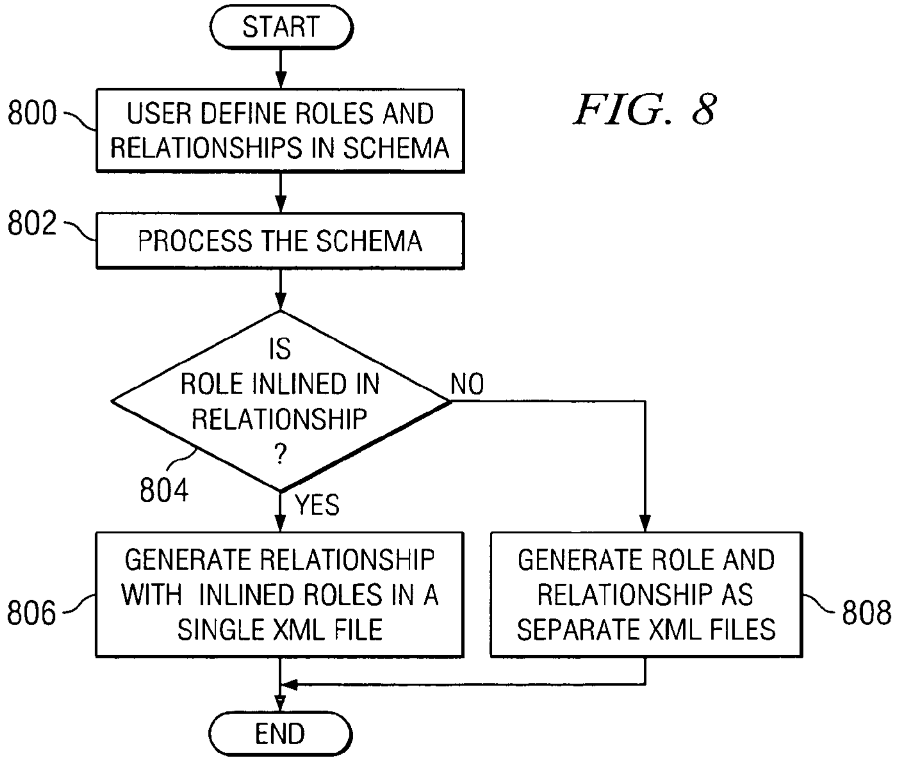
FIG. 8 is a flowchart illustrating an exemplary process for deploying roles and relationship as a single entity in accordance with an illustrative embodiment of the present invention.

Turning now to FIG. 8, a flowchart illustrating an exemplary process for deploying roles and relationship as a single entity is depicted in accordance with an illustrative embodiment of the present invention. As shown in FIG. 8, the process begins when the user defines roles and relationships in a schema (step 800), such as schema 400 and 500 in FIGS. 4 and 5. Once the schema is defined, the schema is processed by a processor (step 802) and a determination is made by the processor as to whether the role defined in the schema is inlined in a relationship (step 804).

If the role is inlined in a relationship, the processor generates the relationship with inlined roles in a single XML file (step 806). If the role is not inlined in the relationship, the processor generates the role and the relationship as separate XML files (step 808) and the process terminates thereafter.

Thus, aspects of the present invention allow roles to be inlined in a relationship or to be independent of a relationship, such that the roles may be deployed with the relationship or separate from the relationship. In this way, no changes would be required in applications that use this relationship if a new role is added, which results in a reduction of system down time. In addition, roles and relationships may be managed more efficiently.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store, the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for deployment of roles, the computer implemented method comprising:

providing, in a schema defined within a business integration environment running on a business integration server that includes a processor, a definition of a relationship that correlates different business objects, wherein the relationship comprises a set of roles participating in the relationship, wherein each role in the set of roles further comprises a description of how the business objects can participate in the relationship, and wherein the set of roles includes one inlined role and an independent role, and further wherein the inlined role is embedded within the definition of the relationship and the independent role is defined outside of the definition of the relationship;

defining at least one role within the set of roles as an inlined role within the definition of the relationship as a role base, wherein the role base includes a role object type representing one of the business objects that corresponds to the at least one role, and wherein the inline role comprises the at least one role defined within the definition of the relationship;

defining another at least one role within the set of roles as the independent role outside of the definition of the relationship, wherein the independent role comprises the another at least one role that is independent of the definition of the relationship, wherein the independent role extends the role base, and wherein the independent role includes a relationship element pointing to the relationship, and further wherein the relationship element includes a role object type that represents one of the business objects;

determining if a given role in the set of roles is one of the inlined role and the independent role based on the definition of the relationship;

responsive to determining that the given role is the inlined role, generating, by the processor, a single output file comprising the relationship that includes the inlined role, and deploying, in an application that is executing on the business integration server, the relationship and the given role as a single entity; and responsive to determining that the given role is the independent role, generating, by the processor, a first output file for the relationship and a second output file for the independent role, and deploying, in the application, the relationship and the given role as separate entities.

2. The method of claim 1, wherein the single output file, the first output file, and the second output file are extensible markup language files.

3. A data processing system for deployment of roles, the data processing system comprising:

a bus, a storage device, wherein the storage device contains computer usable code;

a communications unit connected to the bus; and a processing unit connected to the bus, wherein the processing unit executes the computer usable code to: provide, in a schema defined within a business integration environment running on a business integration server that includes a processor, a definition of a relationship that correlates different business objects, wherein the relationship comprises a set of roles participating in the relationship, wherein each role in the set of roles further comprises a description of how the business objects can participate in the relationship, and wherein the set of roles includes one inlined role and an independent role, and further wherein the inlined role is embedded within the definition of the relationship and the independent role is defined outside of the definition of the relationship; define at least one role within the set of roles as an inlined role within the definition of the relationship as a role base, wherein the role base includes a role object type representing one of the business objects that corresponds to the at least one role, and wherein the inline role comprises the at least one role defined within the definition of the relationship; define another at least one role within the set of roles as the independent role outside of the definition of the relationship, wherein the independent role comprises the another at least one role that is independent of the definition of the relationship, wherein the independent role extends the role base, and wherein the independent role includes a relationship element pointing to the relationship, and further wherein the relationship element includes a role object type that represents one of the business objects; determine if a given role in the set of roles is one of the inlined role and the independent role based on the definition of the relationship; responsive to determining that the given role is the inlined role, generate, by the processor, a single output file comprising the relationship that includes the inlined role, and deploying, in an application that is executing on the business integration server, the relationship and the given role as a single entity; and responsive to determining that the given role is the independent role, generate, by the processor, a first output file for the relationship and a second output file for the independent role, and deploying, in the application, the relationship and the given role as separate entities.

4. The data processing system of claim 3, wherein the single output file, the first output file, and the second output file are extensible markup language files.

5. A computer readable medium that stores computer usable program code for deployment of roles, the computer readable medium comprising:

computer usable program code for providing, in a schema defined within a business integration environment running on a business integration server that includes a processor, a definition of a relationship that correlates different business objects, wherein the relationship comprises a set of roles participating in the relationship, wherein each role in the set of roles further comprises a description of how the business objects can participate in the relationship, and wherein the set of roles includes one inlined role and an independent role, and further wherein the inlined role is embedded within the definition of the relationship and the independent role is defined outside of the definition of the relationship;

computer usable program code for defining at least one role within the set of roles as an inlined role within the definition of the relationship as a role base, wherein the role base includes a role object type representing one of the business objects that corresponds to the at least one role, and wherein the inline role comprises the at least one role defined within the definition of the relationship;

computer usable program code for defining another at least one role within the set of roles as the independent role outside of the definition of the relationship, wherein the independent role comprises the another at least one role that is independent of the definition of the relationship, wherein the independent role extends the role base, and wherein the independent role includes a relationship element pointing to the relationship, and further wherein the relationship element includes a role object type that represents one of the business objects;

computer usable program code for determining if a given role in the set of roles is one of the inlined role and the independent role based on the definition of the relationship;

responsive to determining that the given role is the inlined role, computer usable program code for generating, by the processor, a single output file comprising the relationship that includes the inlined role, and deploying, in an application that is executing on the business integration server, the relationship and the given role as a single entity; and responsive to determining that the given role is the independent role, computer usable program code for generating, by the processor, a first output file for the relationship and a second output file for the independent role, and deploying, in the application, the relationship and the given role as separate entities.

6. The computer readable medium of claim 5, wherein the single output file, the first output file, and the second output file are extensible markup language files.

* * * * *